United States Patent [19]

Abdelmaseh et al.

[11] Patent Number: 4,648,570
[45] Date of Patent: Mar. 10, 1987

[54] METHOD AND APPARATUS FOR SUPPORTING INTERIOR AIRCRAFT ELEMENTS

[75] Inventors: Michael E. Abdelmaseh, Everett; Thomas H. Shorey, Freeland Island, both of Wash.

[73] Assignee: The Boeing Company, Seattle, Wash.

[21] Appl. No.: 644,027

[22] Filed: Aug. 22, 1984

[51] Int. Cl.$^4$ .......................... B64C 1/06; B64C 1/22
[52] U.S. Cl. ............................ 244/118.1; 244/119; 244/118.2; 244/117 R; 244/131; 267/141.1
[58] Field of Search ............ 244/117 R, 118.1, 118.2, 244/119, 127, 131; 403/187, 192, 221, 222, 224, 227; 52/655, 648, 573; 267/21 R, 118, 138, 141.1, 141.2

[56] References Cited

U.S. PATENT DOCUMENTS

| Re. 18,181 | 9/1931 | Stelzer | 244/38 |
|---|---|---|---|
| 1,289,141 | 12/1918 | Ferris | 267/138 |
| 1,840,901 | 1/1932 | Hicks | 244/117 R |
| 1,884,981 | 10/1932 | Otto | 267/70 |
| 1,885,571 | 11/1932 | Wilson | 244/38 |
| 2,008,836 | 7/1935 | Ronan | 244/30 |
| 2,043,980 | 6/1936 | Bellanca | 244/30 |
| 2,066,649 | 1/1937 | Sabins | 244/38 |
| 2,183,323 | 12/1939 | Moss | 244/119 |
| 2,352,296 | 6/1944 | Szego | 114/83 |
| 2,415,975 | 2/1947 | Thomson | 244/118 |
| 2,827,251 | 3/1958 | Doman | 244/119 |
| 3,062,340 | 11/1962 | Hunnebeck | 52/655 |
| 3,123,766 | 3/1964 | Ruddock et al. | 324/4 |
| 3,155,348 | 11/1964 | Ricard | 244/119 |
| 3,498,488 | 3/1970 | Wildey et al. | 214/523 |
| 3,675,592 | 7/1972 | Bateson et al. | 105/368 |
| 3,820,747 | 6/1974 | Bateson et al. | 244/118 |
| 4,153,225 | 5/1979 | Paulsen | 244/118 |
| 4,322,925 | 4/1982 | Geisler, Jr. | 52/573 |
| 4,479,621 | 10/1984 | Bergholz | 244/117 R |

*Primary Examiner*—Trygve M. Blix
*Assistant Examiner*—Rodney Corl
*Attorney, Agent, or Firm*—Joan H. Pauly

[57] ABSTRACT

This invention relates to removable systems for supporting interior passenger elements within an aircraft fuselage (1). The invention is directed toward increasing the efficiency of load transfer, providing quick conversion, and maximizing cargo space. A plurality of longitudinal sections (2, 2') are arranged end-to-end along an axis and connected together by extension/retraction joints (14, 28, 28'). A first end of a diagonal strut (8, 50, 50') is nontranslatably connected to a section (2, 2') just forward of each joint (14, 28, 28'). The other end of strut (8, 50, 50') is nontranslatably connected to the fuselage (1) aft of joint (14, 28, 28'). Axial loads on sections (2, 2') cause sections (2, 2') to slip axially relative to each other, and such loads are transferred from sections (2, 2') to struts (8, 50, 50') and are reacted through fuselage (1). Vertical and side loads are reacted by transverse members (4, 4') that are slip-connected to fuselage (1) and by vertical trusses (6, 40).

18 Claims, 28 Drawing Figures

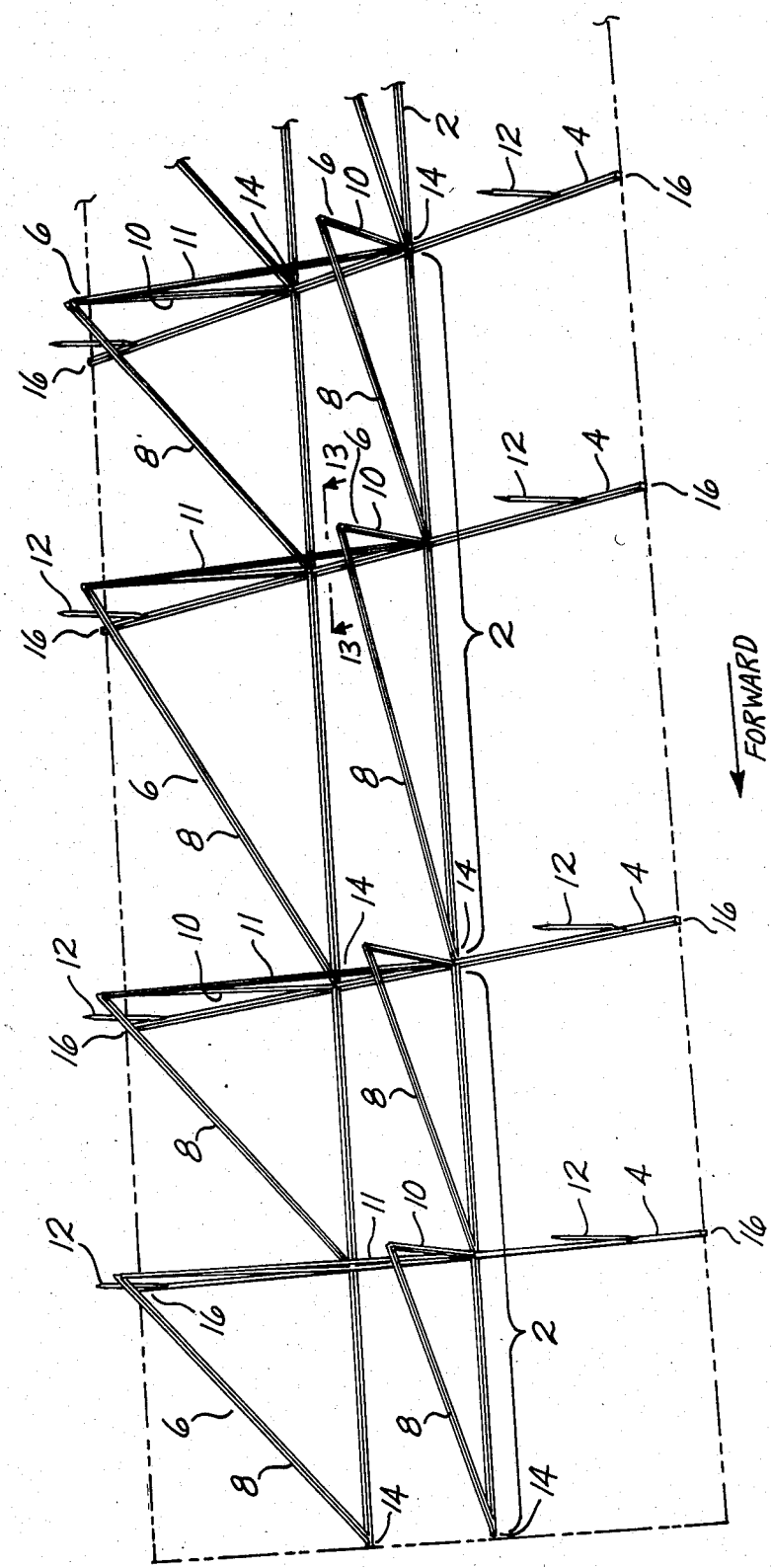

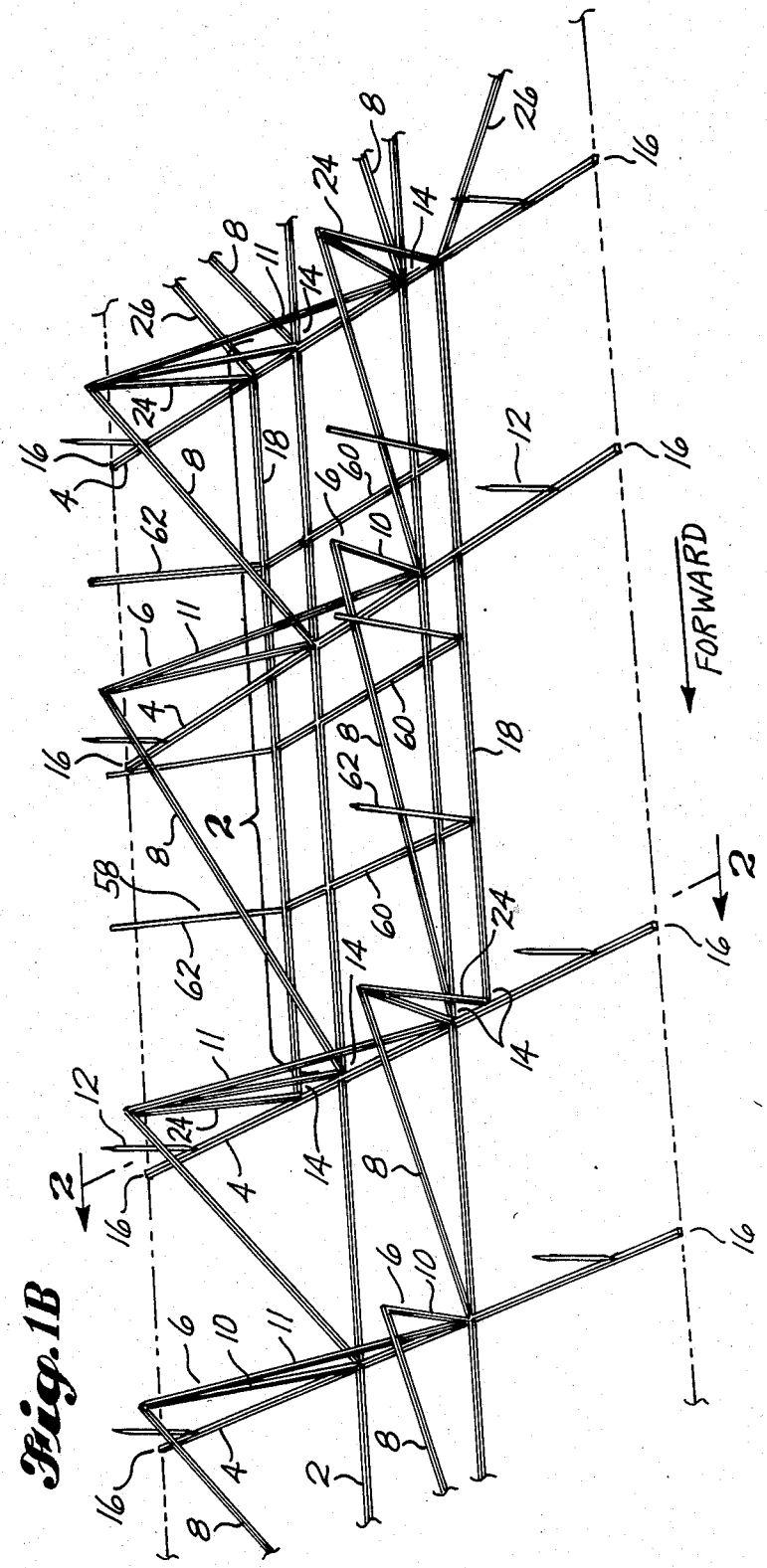

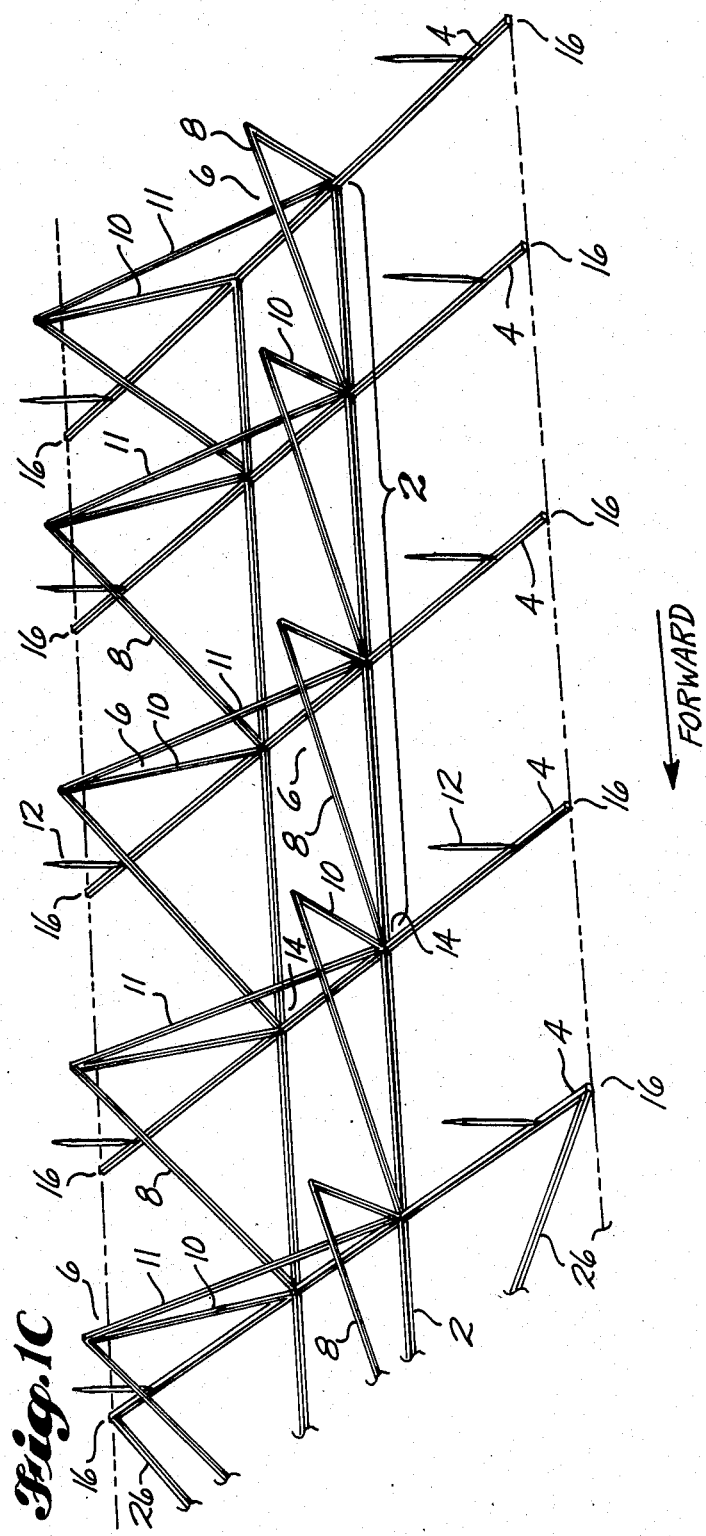

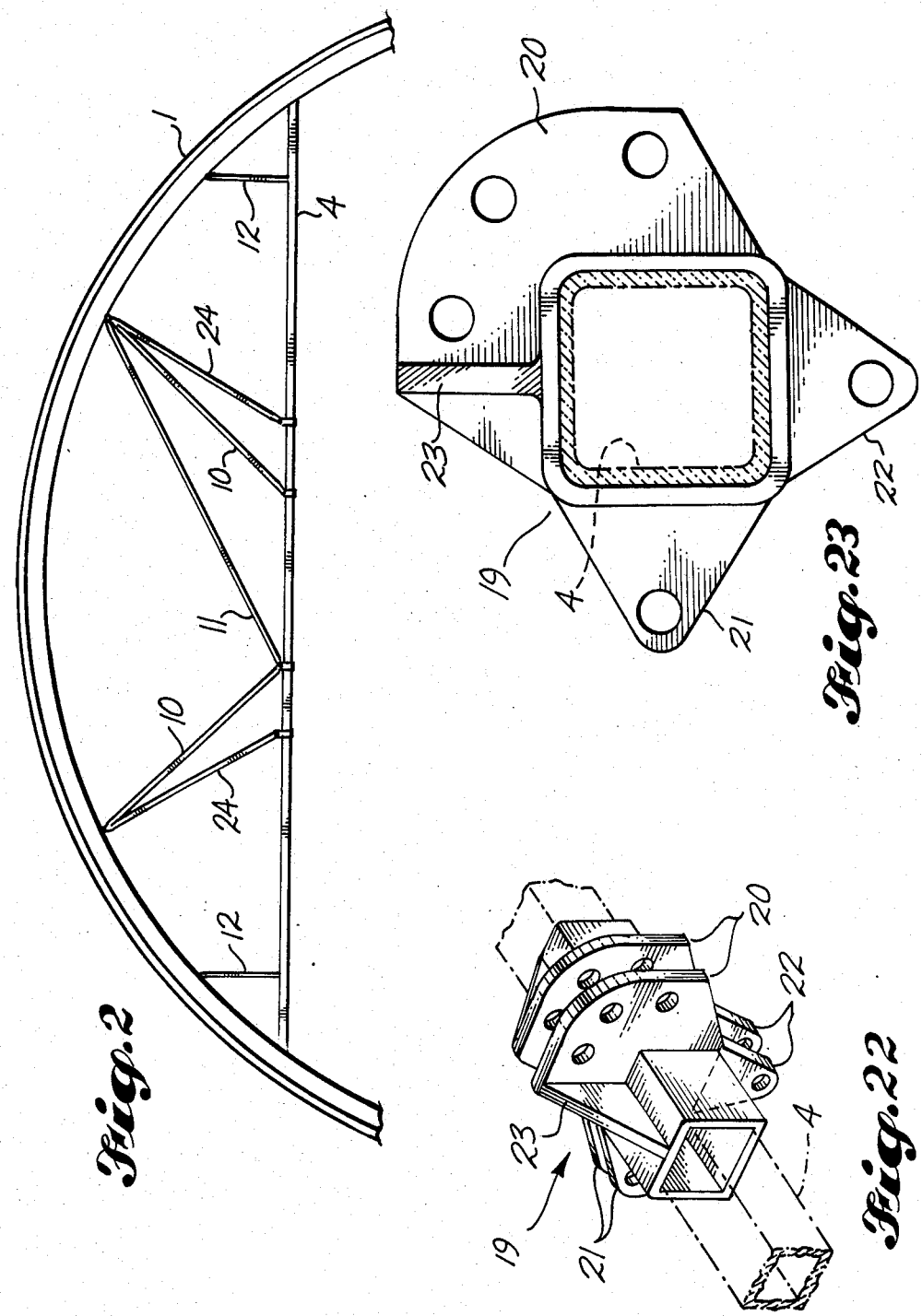

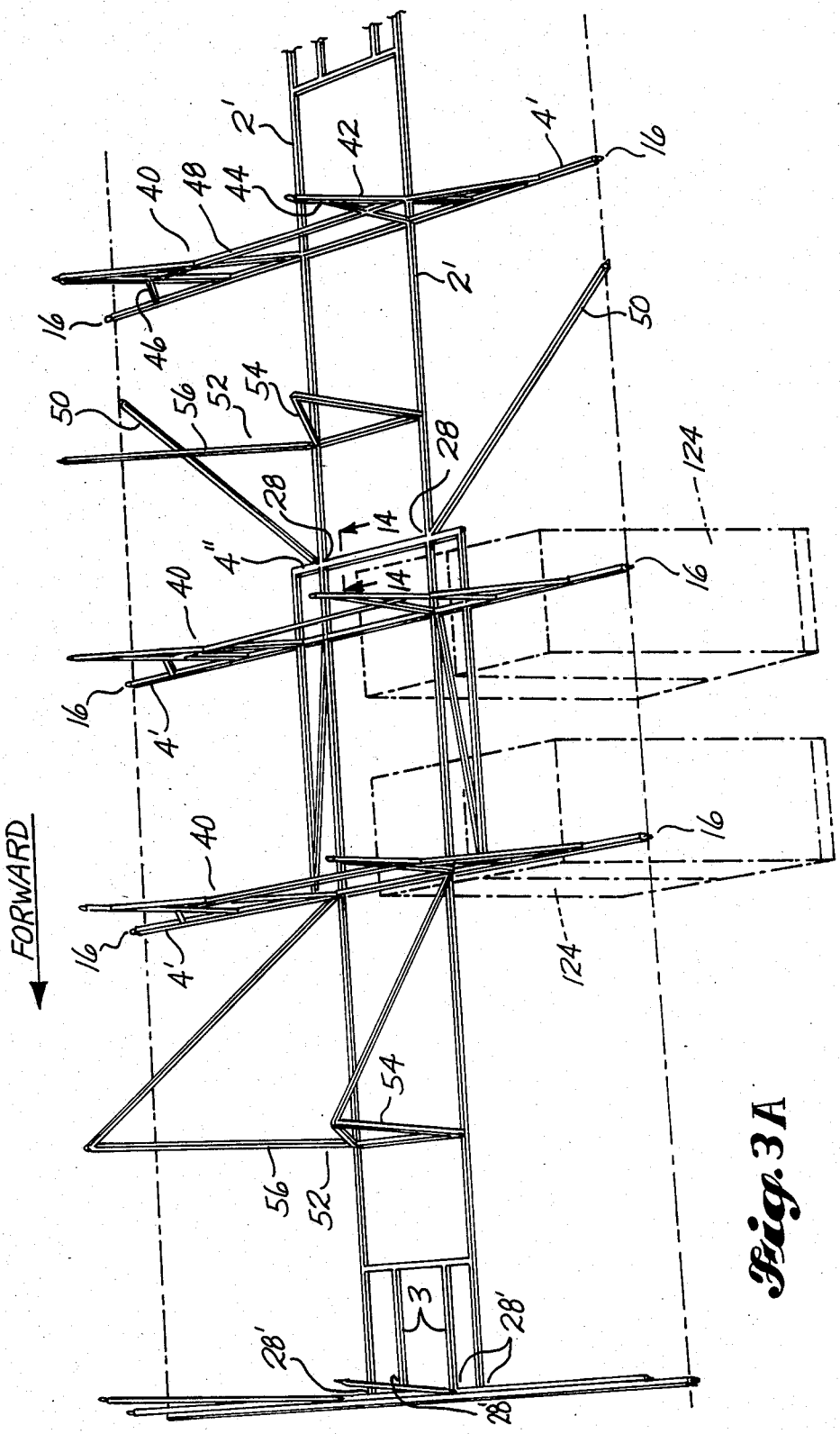

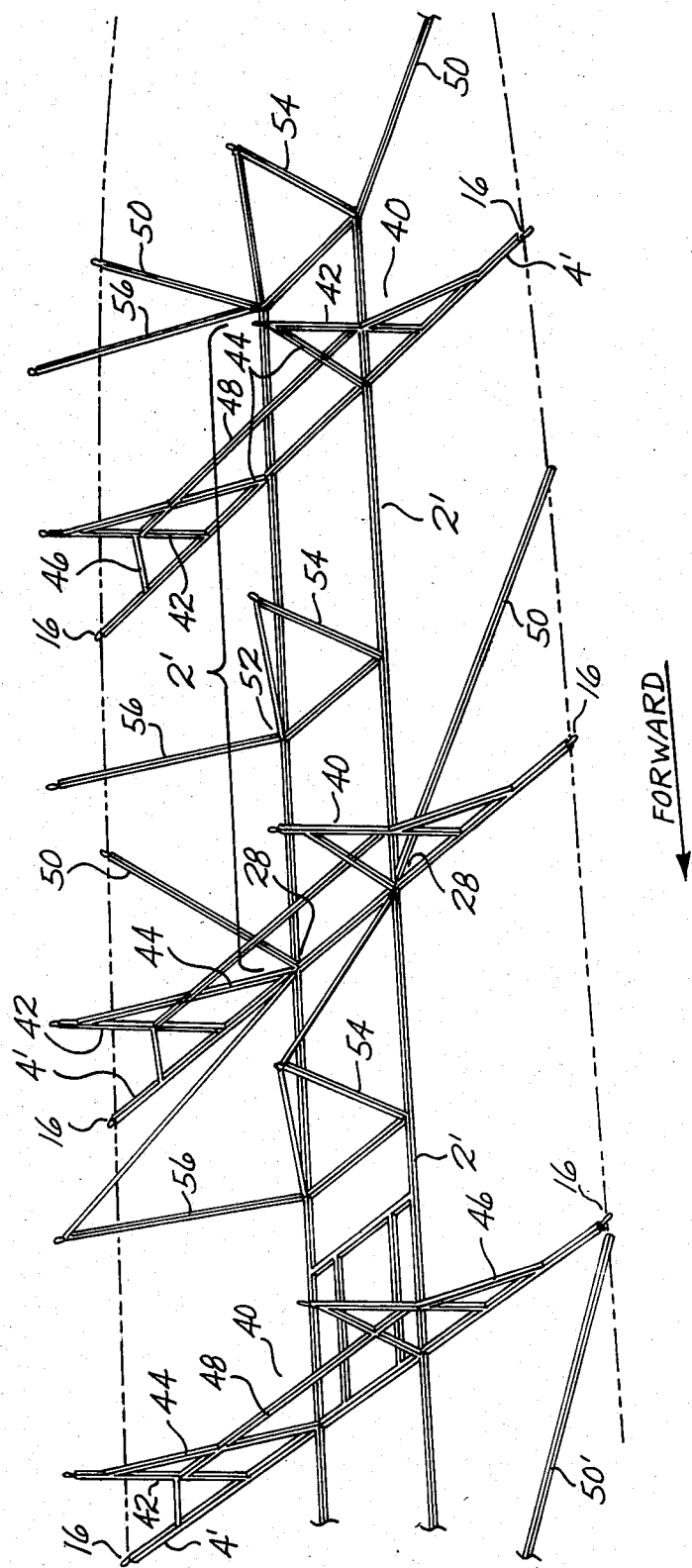

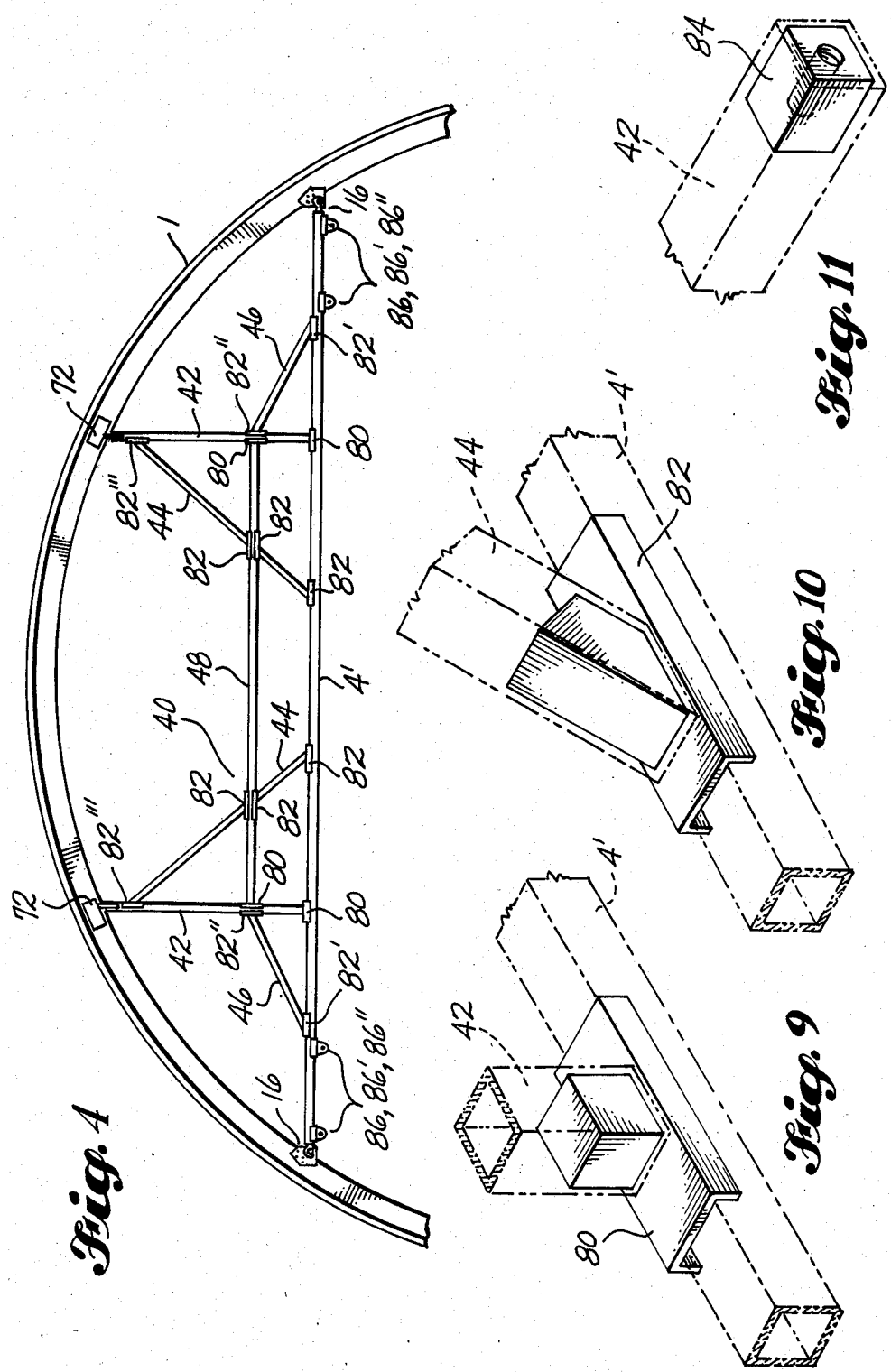

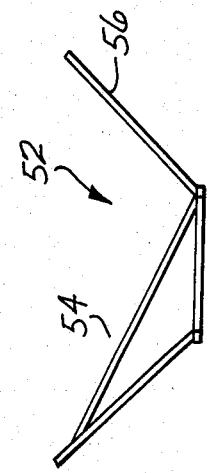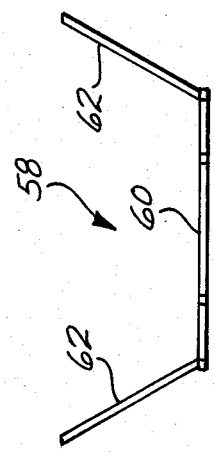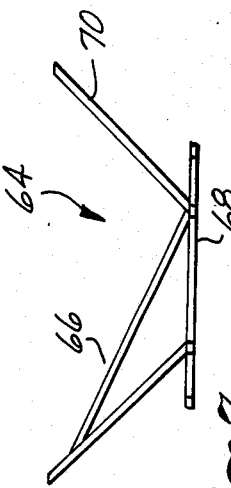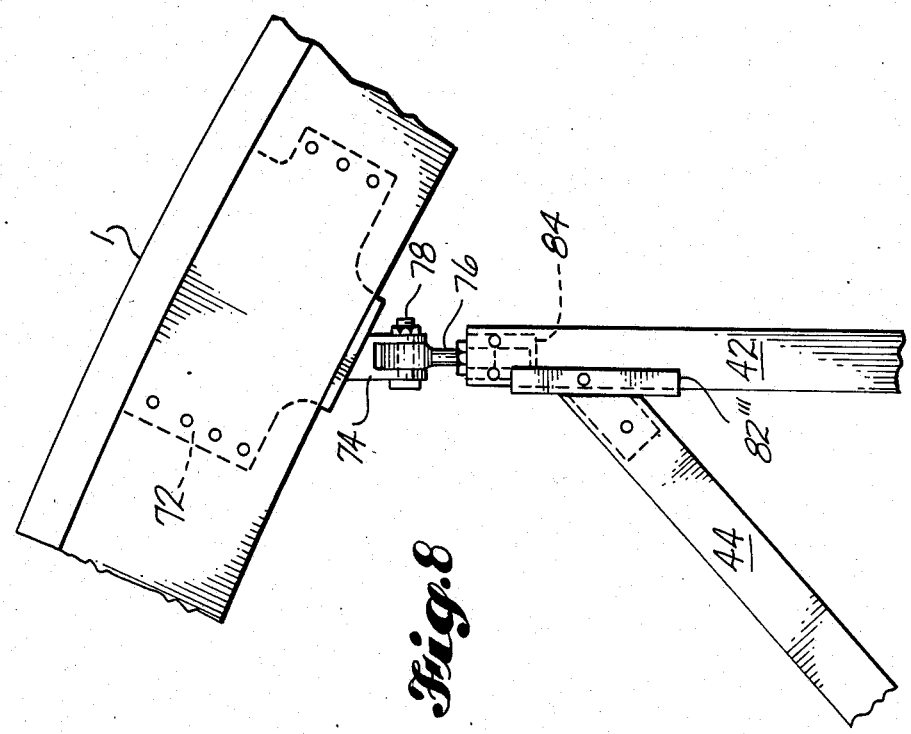

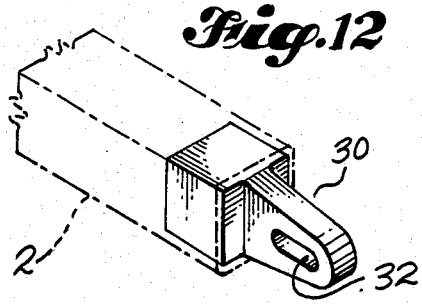
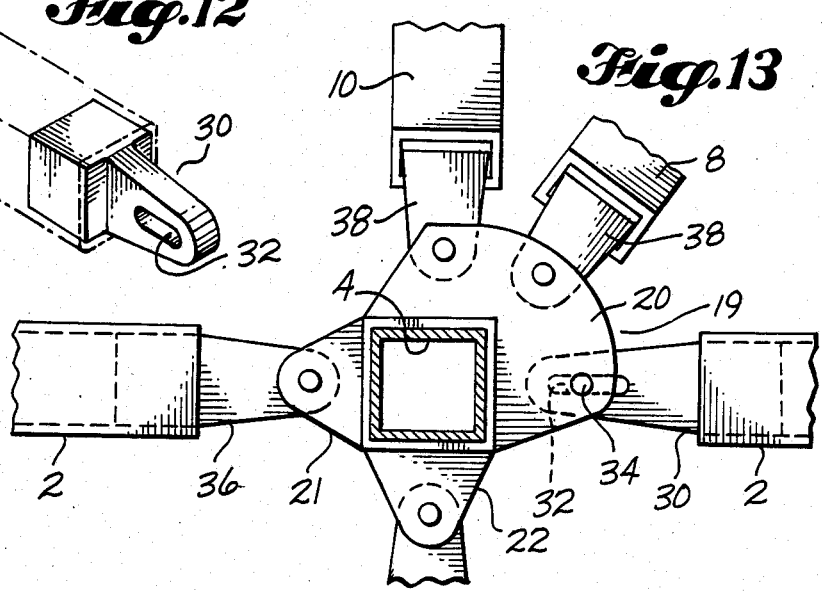
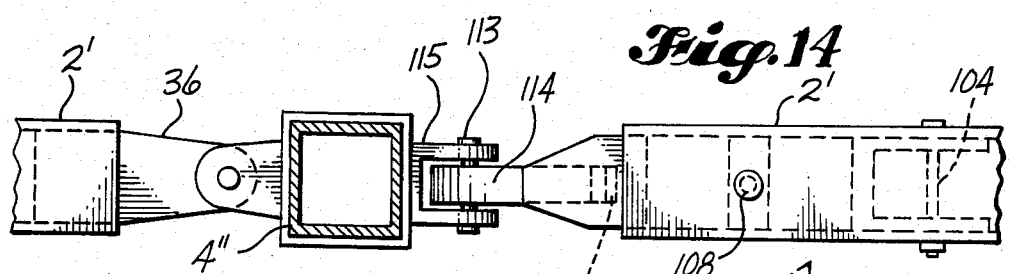
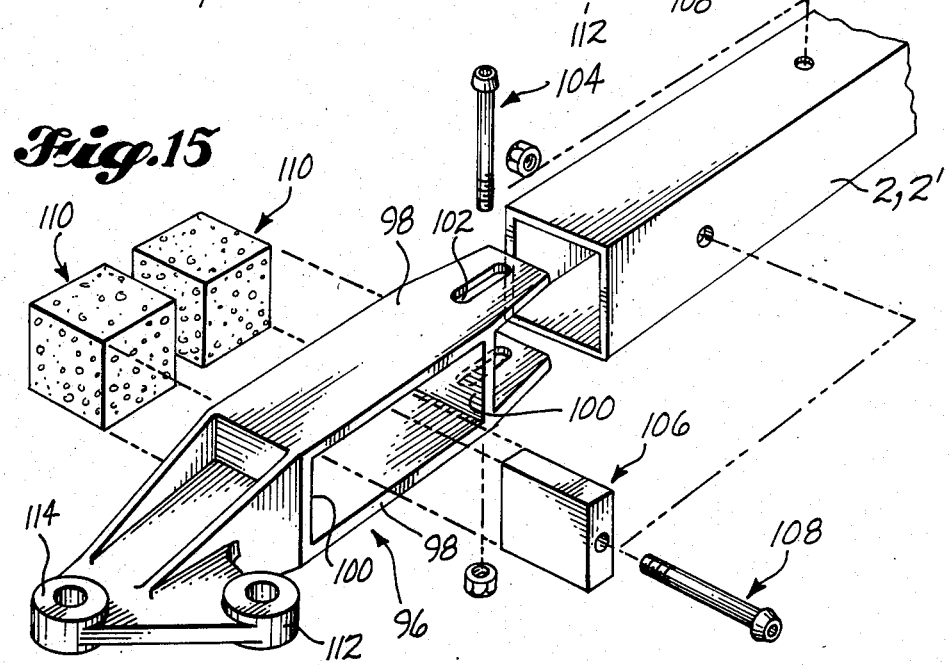

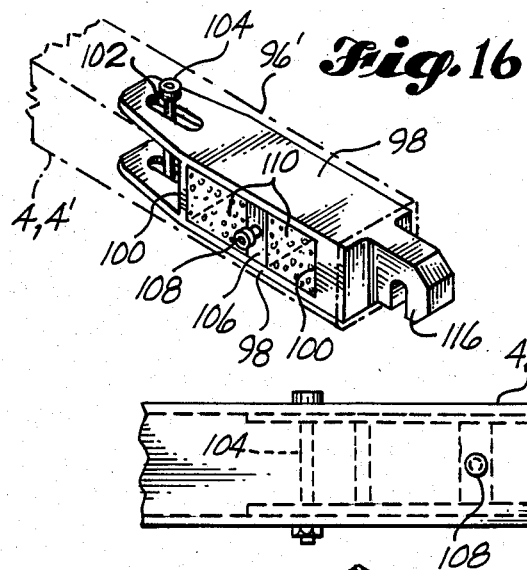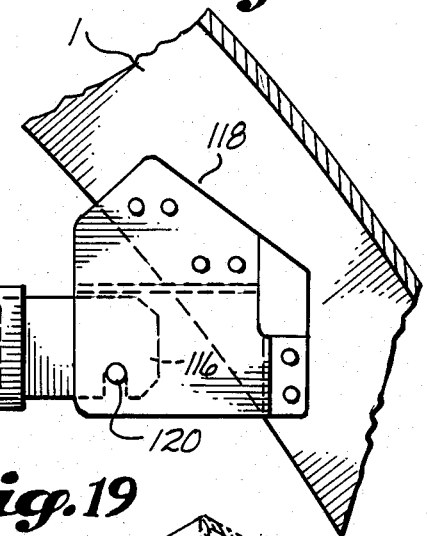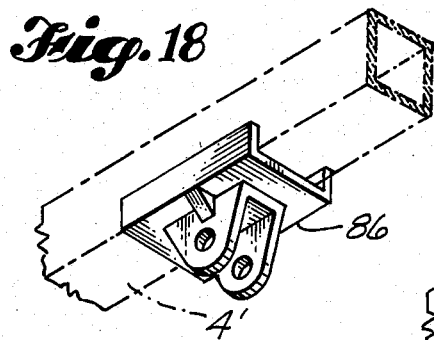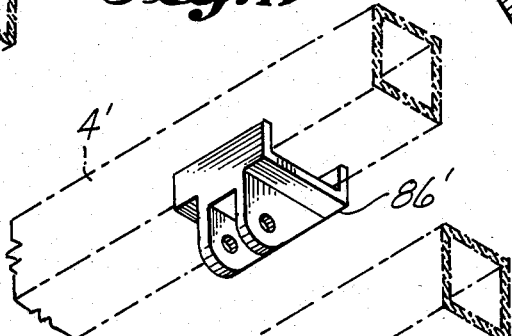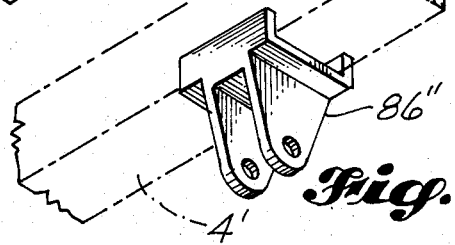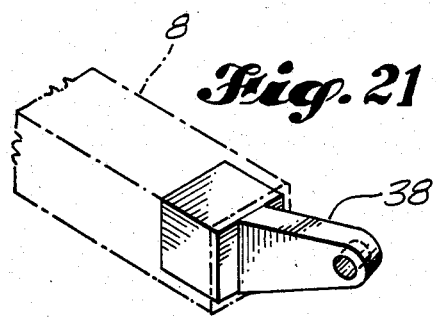

METHOD AND APPARATUS FOR SUPPORTING INTERIOR AIRCRAFT ELEMENTS

DESCRIPTION

Technical Field

This invention relates to support systems for supporting interior elements within an aircraft fuselage and, more particularly, to such a system in which the loads are spread out and are reacted through the fuselage in relatively small magnitudes at a number of locations, in which loads in all directions are reacted through tension and compression, and in which the entire support structure may be quickly and easily removed to convert to a cargo configuration with maximum cargo space.

Background Art

The need for greater flexibility in the use of aircraft by airlines, especially smaller airlines, has led to a recent popularity of airplanes in which all or a portion of the interior of the fuselage may be converted from a passenger configuration to a cargo configuration and vice versa. Problems associated with such airplanes include the need to increase the load capability of the structure that supports the interior elements of the airplane in the passenger configuration without incurring a significant weight penalty due to increased weight of such supporting structure, the need to make the conversion process quicker and more economical, and the need to maximize the use of the aircraft by maximizing the cargo space available in the cargo configuration. Each of these needs stems from the overall and ever present need for airlines to operate in the most efficient and economical manner possible.

In one well-known airplane with a convertible interior, the support structure for supporting the interior elements of the passenger configuration includes a large heavy support beam extending transversely across the interior of the fuselage above each of the passenger entry doors. The support beams react the 1.5 g aft loads experienced during normal operation of the airplane and are also designed to react forward loads of up to 9 g (the crash load). The normal 5 g vertical loads and 1.5 g side loads are reacted through vertical support tubes positioned at regular intervals between the support beams. In this system, the largest load, the 9 g forward crash load, is reacted in bending, through a beam spanning the entire width of the airplane. This method of load transfer is very inefficient in that the ratio of the weight of the supporting structure to the weight supported thereby is relatively high. Another drawback of this system is that the time required for converting the interior from one configuration to another is relatively long. In addition, the cargo space in the cargo configuration is not maximized and the types of cargo that may be placed in portions of the interior are limited because the support beams are permanently attached to the fuselage and cannot be removed when the airplane is converted to the cargo configuration.

The following United States Patents each disclose structure that provides the primary structural support for the fuselage or main body of an aircraft:

U.S. Pat. No. 2,008,836, granted July 23, 1935, to K. M. Ronan;

U.S. Pat. No. 2,043,980, granted June 16, 1936, to G. M. Bellanca;

U.S. Pat. No. 2,183,323, granted Dec. 12, 1939, to D. G. Moss;

U.S. Pat. No. 2,352,296, granted June 27, 1944, to S. D. Szego;

U.S. Pat. No. 2,415,975, granted Feb. 18, 1947, to R. H. Thomson;

U.S. Pat. No. 2,827,251, granted Mar. 18, 1958, to G. S. Doman;

U.S. Pat. No. 3,155,348, granted Nov. 3, 1964, to A. G. Ricard;

U.S. Pat. No. 3,675,592, granted July 11, 1972, to N. E. Bateson et al; and

U.S. Pat. No. 3,820,747, granted June 28, 1974, to N. E. Bateson et al.

U.S. Pat. No. 3,123,766, granted Mar. 3, 1964, to K. A. Ruddock et al discloses a truss structure that is mounted to the exterior of the body of a helicopter at the underside of the body and that supports electromagnetic prospecting apparatus. U.S. Pat. No. 4,153,225, granted May 8, 1979, to D. E. Paulsen discloses an arrangement of equipment racks inside the belly of a wide-bodied aircraft. Each rack has a rigid framework which includes four vertical stanchions the lower ends of which are fixed to the ribs of the aircraft and the upper ends of which are connected to the floor of the cabin. The upper connections are made by means of pin and bracket assemblies that allow vertical flexure of the deck relative to the tops of the racks.

The patent literature includes a large number of means for connecting two bodies and allowing relative movement between such bodies. U.S. Pat. No. 1,884,981, granted Oct. 25, 1932, to F. Otto, and U.S. Pat. No. 3,498,488, granted Mar. 3, 1970, to A. J. Wildey et al each disclose a connection in which a spring is compressed between opposite end plates, each of which is carried by a different one of the bodies being connected. U.S. Pat. Nos. 1,885,571, granted Nov. 1, 1932, to B. F. Wilson, and 2,066,649, granted Jan. 5, 1937, to R. C. Sabins each disclose a connection that includes a cylinder closed at both ends, a piston movable within the cylinder, and a spring on each side of the piston. The cylinder is mounted to one body, and the piston is attached to the other body. U.S. Pat. No. Re. 18,181, reissued on Sept. 8, 1931, to W. Stelzer discloses a connection in which a piston/cylinder dash pot arrangement is used to control movement between two bodies.

The known structures and patents discussed above and the prior art that is discussed and/or cited in the patents should be studied for the purpose of putting the present invention into proper perspective relative to the prior art.

Disclosure of the Invention

A subject of this invention is support structure for supporting interior elements of an aircraft within an aircraft fuselage. According to an aspect of the invention, the support structure comprises a plurality of longitudinal sections arranged end-to-end along a common longitudinal axis. An extension/retraction joint connects each such section and any adjacent section, to allow axial slippage of each such section relative to the other sections. A plurality of diagonal struts is provided, one corresponding to each such joint. Each strut has a first end nontranslatably connected to one of said sections at a location forward of and closely adjacent to the corresponding joint, and a second end nontranslatably connected to the fuselage at a location aft of the corresponding joint. The structure also includes means for reacting vertical and side loads. Axial loads on the sections cause the sections to slip axially relative to each other. The axial loads are transferred from the sections to the diagonal struts and are reacted through the fuselage.

According to a preferred aspect of the invention, the means for reacting vertical and side loads includes a plurality of transverse members each of which is attached to one of said sections. Each transverse member has a longitudinal axis substantially perpendicular to the longitudinal axis of the sections and two opposite ends connected to the fuselage. Extension/retraction joint means is provided for allowing axial slippage of the transverse members to allow for expansion and deflection of the fuselage caused by pressurization and maneuver loads.

According to another aspect of the invention, the means for reacting vertical and side loads includes a plurality of vertically oriented trusses. Each of these trusses has an apex nontranslatably connected to the fuselage and a lower portion nontranslatably connected to one of said sections.

A preferred feature of the support structure is essentially complete removability from the aircraft so that available cargo space within the fuselage is maximized. In the preferred embodiment of the support structure, each extension/retraction joint connecting said sections includes means for quickly and easily disconnecting the sections from each other. The extension/retraction joint means associated with the transverse members comprises an extension/retraction joint detachably connecting each end of each transverse member to the fuselage. The support structure also includes an extension/retraction joint detachably connecting the forward end of the forwardmost of said sections to a first support, and means for nontranslatably and detachably attaching the aft end of the aftmost of said sections to a second support. The support structure is provided with means for quickly and easily disconnecting said sections from the transverse members and the diagonal struts, the diagonal struts from the fuselage, and the trusses from the fuselage and said sections and transverse members.

According to another preferred aspect of the invention, each of the longitudinal sections and the transverse members comprises a tubular body. Each of the extension/retraction joints connecting the longitudinal sections to each other, and the transverse members to the fuselage, includes a sliding portion that is removably and telescopically received into one of these tubular bodies. Each such joint also includes biasing means for biasing the sliding portion into a center axial position relative to the tubular body. Preferably, each of these sliding portions includes two axially spaced apart radial walls, and each such joint further includes a third radial wall. This third wall is positioned axially between the spaced apart radial walls and is fixed with respect to the tubular body. A resilient member is positioned axially between and abutting the third radial wall and each of the spaced apart radial walls.

In a first preferred embodiment of the invention, each of the diagonal struts extends generally upwardly and aftwardly from the section to which it is nontranslatably connected. The means for reacting vertical and side loads includes a plurality of transverse members each of which is attached to one of the longitudinal sections and has a longitudinal axis substantially perpendicular to the longitudinal axis of said sections. Each transverse member has two opposite ends connected to the fuselage. Extension/retraction joint means allows axial slippage of the transverse members to allow for expansion and deflection of the fuselage caused by pressurization and maneuver loads. The means for reacting vertical and side loads also includes a plurality of vertically oriented trusses each of which has a first member formed by one of the diagonal struts, a second member formed by a portion of said sections, and a generally vertical third member connecting the first and second members.

In a second preferred embodiment of the support structure, each of the diagonal struts is substantially horizontal. The means for reacting vertical and side loads includes a plurality of transverse members and extension/retraction joint means essentially the same as the transverse members and extension/retraction joint means of the first preferred embodiment. The means for reacting vertical and side loads also includes a plurality of vertically oriented trusses each of which has a first member formed by a portion of one of the transverse members, a vertical second member, a third member connecting the first and second members, and an apex at which the second and third members are connected to each other and the fuselage. In this embodiment, said sections and the extension/retraction joints associated with such sections may be viewed as forming a first set of sections. Preferably, the support structure further comprises a second set of sections parallel to and laterally spaced from this first set and substantially identical to the first set. Each of the transverse members is attached to one of the sections in each set. The support structure also includes a substantially horizontal diagonal strut corresponding to each joint in the second set of sections. These struts each have a first end nontranslatably connected to one of the sections in the second set at a location forward of and closely adjacent to the corresponding joint and a second end nontranslatably connected to the fuselage at a location aft of the corresponding joint and laterally opposite the location at which one of the diagonal struts extending between the sections in the first set and the fuselage is connected to the fuselage.

Another subject of the invention is a joint for connecting two members and for allowing said members to translate with respect to each other along an axis. According to an aspect of the invention, the joint comprises first and second end portions arranged telescopically with respect to each other along the axis. Each of these portions is attached to a different one of said members. The first end portion is tubular. The second end portion is received into the first end portion and has two axially spaced apart radial walls. The joint also includes a third radial wall positioned axially between the spaced apart radial walls and fixed with respect to the first end portion. A resilient member is positioned axially between and abutting the third radial wall and each of the spaced apart radial walls.

Preferably, each of the end portions of the joint is generally rectangular. The second end portion includes two opposite axial walls connecting edge portions of the spaced apart radial walls, and at least one side opening for receiving the third radial wall and the resilient members. The joint also includes fastening means extending through the third radial wall and opposite sidewalls of the first end portion to fix the third radial wall relative to the first end portion.

A preferred feature of the joint of the invention is the provision of each of the axial walls of the second end portion with a cantilever portion projecting axially inwardly with respect to the first end portion. Each such cantilever portion has an axial slot therethrough. The joint also includes a pin that extends through these slots and opposite sidewalls of the first end portion, to allow relative axial movement of the first and second end portions and to limit such movement.

Another subject of the invention is a method of supporting interior elements of an aircraft within an aircraft fuselage. According to an aspect of the invention, the method comprises arranging a plurality of longitudinal sections end-to-end along a common longitudinal axis and connecting each section to any adjacent section with an extension/retraction joint. One end of a diagonal strut is nontranslatably connected to one of the sections just forward of each of these joints, and the other end of the strut is nontranslatably connected to the fuselage aft of said one end. The sections are allowed to slip axially relative to each other when subjected to axial loads. The loads are transferred from the sections to the diagonal struts and are reacted through the fuselage.

In its preferred form, the method also comprises attaching an axially intermediate portion of each of a plurality of transverse members to one of the longitudinal sections. The ends of each transverse member are connected to opposite sides of the fuselage with extension/retraction joints. The transverse members are allowed to slip axially relative to the fuselage to allow for expansion and deflection of the fuselage caused by pressurization and maneuver loads. Another preferred feature of the method of the invention is nontranslatably connecting an apex of each of a plurality of vertically oriented trusses to the fuselage, nontranslatably connecting a lower portion of each such truss to one of said sections, and allowing the trusses to react vertical loads through the fuselage.

Still another subject of the invention is a method of supporting interior elements for passengers within a portion of an aircraft fuselage and of converting such portion to a configuration for carrying cargo with maximized cargo space. According to an aspect of the invention, this method comprises arranging a plurality of longitudinal sections end-to-end along a common longitudinal axis. Each section is detachably connected to any adjacent section with an extension/retraction joint. The two ends of a diagonal strut are nontranslatably and detachably connected, one end to one of the sections just forward of each such joint and the other end to the fuselage aft of said one end. The sections are allowed to slip axially relative to each other when subjected to axial loads. The loads are transferred from the sections to the diagonal struts and are reacted through the fuselage. To convert said portion of the fuselage to a cargo configuration, the sections are detached from each other and the struts are detached from the sections and the fuselage, and the sections and struts are removed from such portion.

The support structure and method of the present invention solve the problems discussed above in connection with known support structures. Support structure constructed in accordance with the invention has relatively high load carrying capability but is itself relatively lightweight. Such structure may also be relatively easily and quickly removed from or installed in an aircraft so that conversion from the passenger configuration to the cargo configuration or vice versa is efficient and economical. In addition, the structure of the invention readily lends itself to essentially complete removal from the aircraft so that available cargo space in the cargo configuration may be maximized.

In structures constructed according to the invention, the forward and aft loads, including the large 9 g forward crash load, are efficiently reacted through tension and compression. The provision of a number of longitudinal sections connected by extension/retraction joints and of diagonal struts extending between such sections and the fuselage causes the forward and aft axial loads to be spread out and reacted through the fuselage in relatively small magnitudes at a number of locations. In this arrangement for reacting axial loads, the longitudinal sections and diagonal struts need not be large or heavy but rather may be constructed from square aluminum tubing. Such tubing has very good tension and compression load carrying capacity in relation to its weight.

The arrangement of the elements of the support structure of the invention and the ability to use aluminum tubing also make it possible for each of the parts of the support structure to be relatively small and lightweight and to be connected to each other, the fuselage, or other structures by means that may be readily attached or detached. This "erector-set construction" makes it possible to convert the interior of the aircraft relatively quickly and easily from one configuration to another. The use of relatively small and lightweight parts also makes it relatively easy and economical to essentially completely remove the support structure from the fuselage in order to maximize the available cargo space in the cargo configuration. The "erector-set construction" also greatly contributes to the versatility of the support structure and renders it easily adaptable to changing needs in a particular aircraft or to differing dimensions and/or load requirements in a different aircraft. The use of aluminum tubing also reduces the cost of manufacture and maintenance and provides further economies by permitting a high degree of commonality of parts.

The joint of the invention is particularly well designed for use with members constructed from square aluminum tubing. The joint of the invention is very economical because of its simplicity of construction and great reliability. These features help to minimize both manufacture costs and maintenance costs. The joint of the invention is highly versatile since it can be used in a wide variety of locations and configurations. The joint may be readily adjusted to changing or differing load requirements simply by replacing the resilient members with other resilient members having a different degree of stiffness. The preferred embodiment of the joint is especially easy to assemble, install, and maintain. For example, if for some reason one of the resilient members should need replacing, all that is required is to separate the two portions of the joint, slide the resilient member out of position, slide in a new resilient member, and reconnect the two portions.

These and other advantages and features will become apparent from the detailed description of the best modes for carrying out the invention that follows.

BRIEF DESCRIPTION OF THE DRAWINGS

In the drawings, like element designations refer to like parts throughout, and:

FIGS. 1A, 1B, and 1C are pictorial views of the forward, center, and aft portions, respectively, of the first preferred embodiment of the support structure of the invention.

FIG. 2 is a sectional view taken along the line 2—2 in FIG. 1B.

FIGS. 3A, 3B, and 3C are pictorial views of the forward, center, and aft portions, respectively, of a second preferred embodiment of the support structure of the invention.

FIG. 4 is an elevational view of a typical transverse member and truss of the embodiment shown in FIGS. 3A–3C.

FIGS. 5–7 are elevational views of supplementary vertical supports that form a part of the second preferred embodiment shown in FIGS. 3A–3C and 4.

FIG. 8 is an elevational view of one of the apex portions of the truss shown in FIG. 4 and the means by which such apex is connected to the fuselage.

FIGS. 9 and 10 are pictorial views of typical connectors used to connect the various members of the support structure of the second embodiment.

FIG. 11 is a pictorial view of one of the connectors shown in FIG. 8.

FIG. 12 is a pictorial view of a connector that forms part of the slip joint used to connect the longitudinal sections in the first preferred embodiment.

FIG. 13 is a fragmentary sectional view taken along the line 13—13 in FIG. 1A.

FIG. 14 is a fragmentary sectional view taken along the line 14—14 in FIG. 3A.

FIG. 15 is an exploded pictorial view of the preferred embodiment of the slip joint used to connect the longitudinal sections in the second preferred embodiment.

FIG. 16 is a pictorial view of the preferred embodiment of the slip joint that connects the transverse members of the support structure to the fuselage.

FIG. 17 is an elevational view of the joint shown in FIG. 16 and the structure by which it is connected to the fuselage.

FIGS. 18–20 are pictorial views of connectors that are attached to lower surfaces of the support structure to provide a means for attaching interior passenger elements, such as stowage bins.

FIG. 21 is a pictorial view of a connector used to connect truss members to the collars carried by the lateral members in the first embodiment.

FIG. 22 is a pictorial view of the collar used in the first embodiment.

FIG. 23 is an elevational view of the collar shown in FIG. 22.

BEST MODES FOR CARRYING OUT THE INVENTION

The drawings show two embodiments of support structure that are constructed according to the invention and that also constitute the best modes of the apparatus of the invention currently known to the applicant. The drawings also illustrate the best mode of carrying out the method of the invention currently known to the applicant. FIGS. 1 and 2 show a first preferred embodiment of the support structure of the invention, which may be referred to as the longitudinal embodiment. FIGS. 3–8 show a second preferred embodiment of the support structure, which may be referred to as the lateral embodiment. FIGS. 14 and 15 show the preferred embodiment of the slip joint that connects the longitudinal sections of the support structure to each other in the lateral embodiment. FIGS. 16 and 17 show the preferred embodiment of the slip joint that connects each end of each transverse member of the support structure to the fuselage in both embodiments. The joint shown in FIGS. 16 and 17 is substantially the same as the joint shown in FIGS. 14 and 15 except for the structure of the outer end of member 96, 96'.

Figure 24:
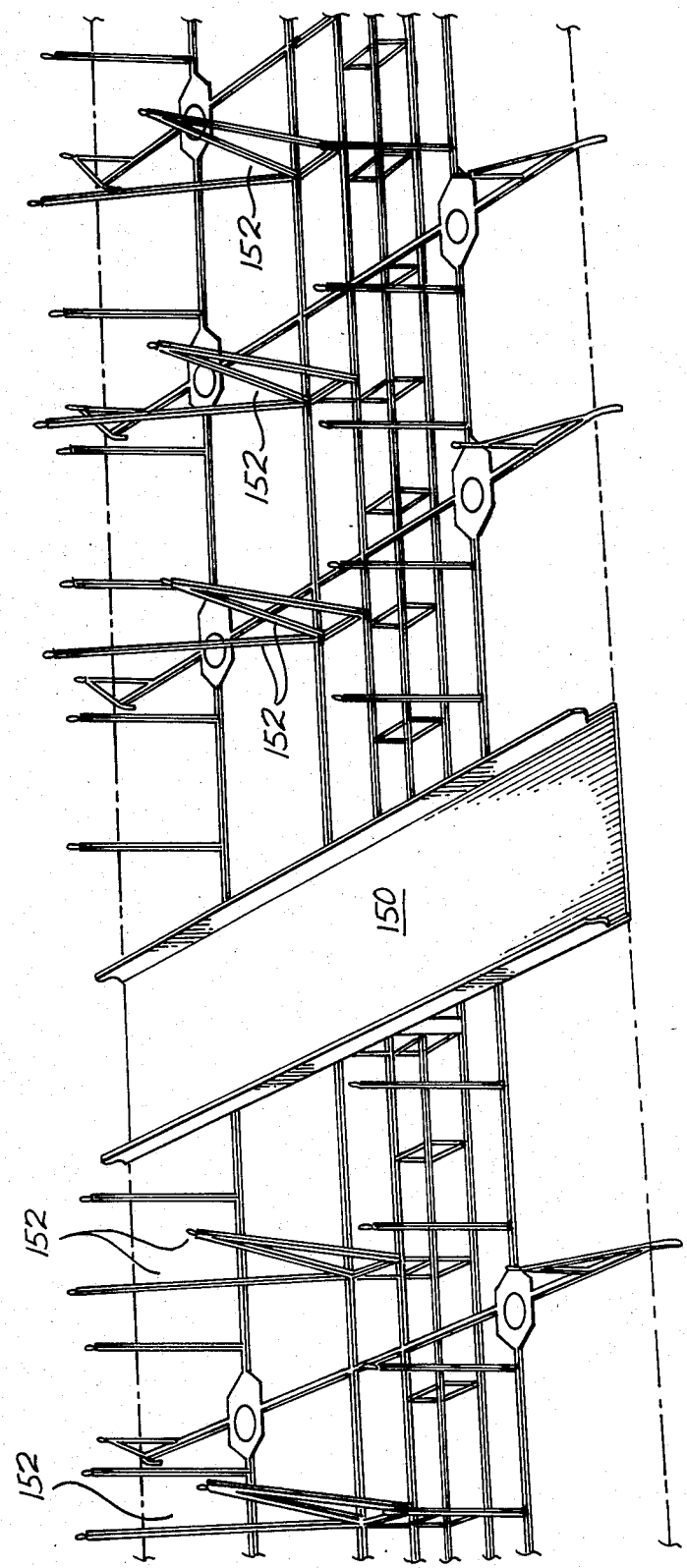
FIG. 24 is a pictorial view of a center portion of a conventional support structure.

For the purposes of comparison, a conventional support structure currently in use is illustrated in FIG. 24. Since it is sufficient for illustrating the relevant aspects of the conventional structure, only the center portion of the structure is shown in FIG. 24. The large beam 150 spans the entire width of the aircraft above the center passenger entry doors. The members identified by reference numeral 152 are the main vertical supports of the conventional structure. The problems associated with the structure shown in FIG. 24 relating to its inefficiency, the time required to convert the interior of the aircraft, and the nonremovability of beam 150 are discussed in some detail above in the Background Art section of this application. The primary object of the present invention is to overcome or at least minimize these problems.

Each of the two preferred embodiments of the support structure of the present invention includes a plurality of longitudinal sections 2, 2' that are arranged end-to-end along a common longitudinal axis. In each of the preferred embodiments shown in the drawings, there are two parallel sets of longitudinal sections 2, 2'. These two sets of sections 2, 2' are essentially identical and are spaced apart laterally. As can be seen in FIGS. 1 and 3, each longitudinal section 2, 2' includes two or more portions each of which extends between two adjacent transverse members. Each section could be formed from a single integral piece, but manufacturing each portion as a separate member and attaching such separate member to the transverse members is more economical and helps to facilitate conversion from one aircraft interior configuration to another by keeping the size and weight of each piece of the support structure at a minimum.

In each of the embodiments of the support structure shown in the drawings, each longitudinal section 2, 2' is connected to any adjacent section 2, 2' in the same set by an extension/retraction joint 14, 28, 28', to allow axial slippage of each of the sections 2, 2' relative to the other sections 2, 2' in the same set. Since each end of a section 2, 2' that is adjacent to another end of a section 2, 2' is directly connected to a transverse member, the adjacent section ends are indirectly rather than directly connected together. FIGS. 13 and 14 show the preferred arrangements for making the connection in the longitudinal and lateral embodiments, respectively.

The extension/retraction joint portion 28 of the connection in the lateral embodiment is shown at the right (as illustrated) of FIG. 14 and is shown in greater detail in FIG. 15. (Joints 28' are essentially the same as joints 28 except for the structure of the outer forward end.) The particular connection shown in FIG. 14 is located at a supplementary lateral member 4" rather than one of the primary lateral members 4', but the structure of the connection is not affected by the shortened lateral extent of member 4". The outer (forward) end of the extension/retraction joint portion 28 of the connection includes a lug 114 that is received into a yoke 115 suitably attached to the transverse member 4" and is nontranslatably secured thereto by means of a pin 113. The aftward end of the adjacent longitudinal section 2', shown at the left of FIG. 14, is nontranslatably attached to the other side of member 4" by means of a similar pin connection that includes a connector 36.

The extension/retraction joint portion 14 of the connection in the longitudinal embodiment is shown at the right (as illustrated) of FIG. 13. The joint 14 includes a connector 30, best shown in FIG. 12, that is received into and attached to the more aftward of the two sections 2 being connected. The outer (forward) end of connector 30 has an axial slot 32 extending therethrough. A pin 34 carried by transverse member 4 engages the slot 32 and is axially slidable therein to allow the aftward section 2 to slip axially with respect to transverse member 4 and the adjacent forward section 2.

The pin 34 is preferably carried by means of a collar 19 that surrounds transverse member 4. See FIGS. 13, 22, and 23. Collar 19 has three yokes 20, 21, 22 extending radially therefrom and an axial stiffener 23. The yokes 20, 21, 22 have axial holes extending therethrough for carrying pins to provide a number of pin connections. Each of the pin connections is nontranslatable except for the connection between connector 30 and yoke 20. The forward section 2 is pin connected to yoke 21 by means of a connector 36. Yoke 22 provides a means for attaching interior elements to the support structure. In addition to connector 30, two angled connectors 38 are pin connected to yoke 20 to in turn connect truss members 8, 10. Connector 38 is best shown in FIG. 21.

The joint 28, which is described in more detail below, has the advantage of providing biasing to a center axial position and of providing dampening of vibrations. The joint 14 has the advantages of relative simplicity and low cost. Of course, some or all of the joints 28 in the lateral embodiment could be replaced by a joint similar to joint 14, and some or all of the joints 14 in the longitudinal embodiment could be replaced by a joint similar to joint 28.

Another feature of each of the embodiments of the support structure shown in the drawings is the provision of a plurality of diagonal struts 8, 50, 50'. There is one such strut 8, 50, 50' corresponding to each slip joint 14, 28, 28' connecting the sections 2, 2' together. Each strut 8, 50, 50' has a first inner end that is nontranslatably connected to the more forward of the two sections connected by the corresponding joint 14, 28, 28' at a location forward of and closely adjacent to the corresponding joint 14, 28, 28'. This connection in the longitudinal embodiment is made by connector 38, collar 19, and connector 36, as shown in FIG. 13 and described above. FIGS. 14 and 15 illustrate this connection in the lateral embodiment. The connection is made by means of a pin joint connection between the strut 50 and a lug 112 that is carried by the forward end of the slip joint 28. The forward end of joint 28 is in turn nontranslatably connected to the more forward of the two sections 2, 2' being connected via pin joint 113, 114, 115, transverse member 4", and connector 36. The other end of each strut 8, 50, 50' is nontranslatably connected to the fuselage 1 at a location aft of the corresponding slip joint 14, 28, 28'.

By this arrangement of longitudinal sections 2, 2', slip joints 14, 28, 28' and diagonal struts 8, 50, 50', axial loads on the sections 2, 2' are transferred from the sections 2, 2' to the struts 8, 50, 50' and are reacted through the fuselage 1 at a number of spread-out locations. Axial loads on the sections 2, 2' cause the sections 2, 2' to slip axially relative to each other. Any axial load forward of a diagonal 8, 50, 50' is transferred to the diagonal 8, 50, 50'. Any load aft of a diagonal 8, 50, 50' causes the longitudinal section 2, 2' aft of the diagonal to slip so that the load is transferred to the next diagonal 8, 50, 50' aft of the load. The axial loads are reacted in tension and compression in relatively small magnitudes at a fairly large number of locations to provide the efficient load capacity per weight of structure that is an important advantage of the structure of the invention.

Each of the embodiments of the support structure also includes means for reacting vertical and side loads. This means includes the transverse members 4, 4' mentioned above. Each member 4, 4' is attached to at least one of the sections 2, 2' in each of the parallel sets of sections 2, 2'. Each member 4, 4' has a longitudinal axis that is substantially perpendicular to the longitudinal axis of each set of sections 2, 2'. The two opposite ends of each member 4, 4' are connected to opposite sides of the fuselage 1 by means of extension/retraction joints 16. This allows the members 4, 4' to slip in the direction of their longitudinal axes with respect to the fuselage 1, to allow for expansion and deflection of the fuselage 1 caused by pressurization and maneuver loads. In other words, the aircraft is allowed to "breathe". FIGS. 16 and 17 illustrate the slip joint 16, which will be described in more detail below.

Each embodiment of the support structure shown in the drawings also includes a plurality of vertically oriented trusses 6, 40. These trusses are the primary means for reacting vertical loads. Each truss 6, 40 has an apex portion nontranslatably connected to the fuselage 1 and a lower portion nontranslatably connected to one of the longitudinal sections 2, 2' and one of the transverse members 4, 4'. FIG. 8 illustrates the connection of an apex to the fuselage 1 in the second lateral configuration. In the lateral configuration, the trusses 40 extend laterally of the fuselage 1, with one truss 40 being associated with each transverse member 4'. In the longitudinal configuration, the trusses 6 extend longitudinally in association with the sections 2. Two trusses 6, one associated with each set of sections 2, extend between each pair of adjacent transverse members 4.

As noted above, the longitudinal embodiment is shown in FIGS. 1 and 2. In this embodiment, each diagonal strut 8 extends generally upwardly and aftwardly from the longitudinal section 2 to which it is nontranslatably connected. Each strut 8 also forms a portion of one of the trusses 6. Each truss 6 is of simple construction and has three members that form a triangle. The members are, respectively, one of the diagonal struts 8, a portion of the longitudinal sections 2, and a generally vertical strut 10 connecting the diagonal 8 and a portion of the sections 2 at which a transverse member 4 intersects the sections 2. Preferably, a strut 11 extends between each pair of laterally adjacent trusses 6 associated with laterally adjacent sections 2, to provide the overall truss structure with greater stability. Each strut 11 extends between the apex of one of the trusses 6 in the pair and the lower end of strut 10 of the other truss 6 in the pair. The support structure shown in FIGS. 1 and 2 also includes a number of supplementary vertical support members 12 positioned as shown in FIGS. 1 and 2. The forwardmost end of each set of longitudinal sections 2 is attached to a suitable support (not shown) by means of a slip joint 14. This connection is essentially the same as the connections between adjacent sections 2 except for the manner in which the joint 14 is connected to the support. The aftmost end of each set is nontranslatably attached to the aftmost transverse member 4.

The center portion of the support structure shown in FIGS. 1 and 2, as shown in FIG. 1B, has additional members to provide greater support for the galleys that are located beneath this center portion in the passenger configuration. These additional members include supplementary longitudinal members 18 that extend along the galley portion of the aircraft parallel to and spaced outboardly from each set of longitudinal sections 2. As can be seen in FIG. 1B, the ends of members 18 are connected to transverse members 4. The additional members also include supplmentary vertical supports 58 that extend between the longitudinal members 18 and that include a transverse member 60 and two opposite generally upwardly and outboardly extending members 62. FIG. 6 shows this supplementary vertical support in elevation. The additional members further include supplementary truss members 24 that extend generally downwardly and outboardly from the apexes of the trusses 6 that are located at the longitudinal edges of the galley area. The forward end of each longitudinal member 18 at the forward edge of the galley area is attached to one of the transverse members 4 by means of a slip joint 14. A supplementary horizontal diagonal 26 is connected to the aft end of each longitudinal member 18 located at the aft edge of the galley area. The two diagonals 26 cooperate with the joints 14 associated with members 18 in essentially the same manner that the diagonals 8 cooperate with the joints 14 connecting the longitudinal sections 2 together.

Figure 3B:
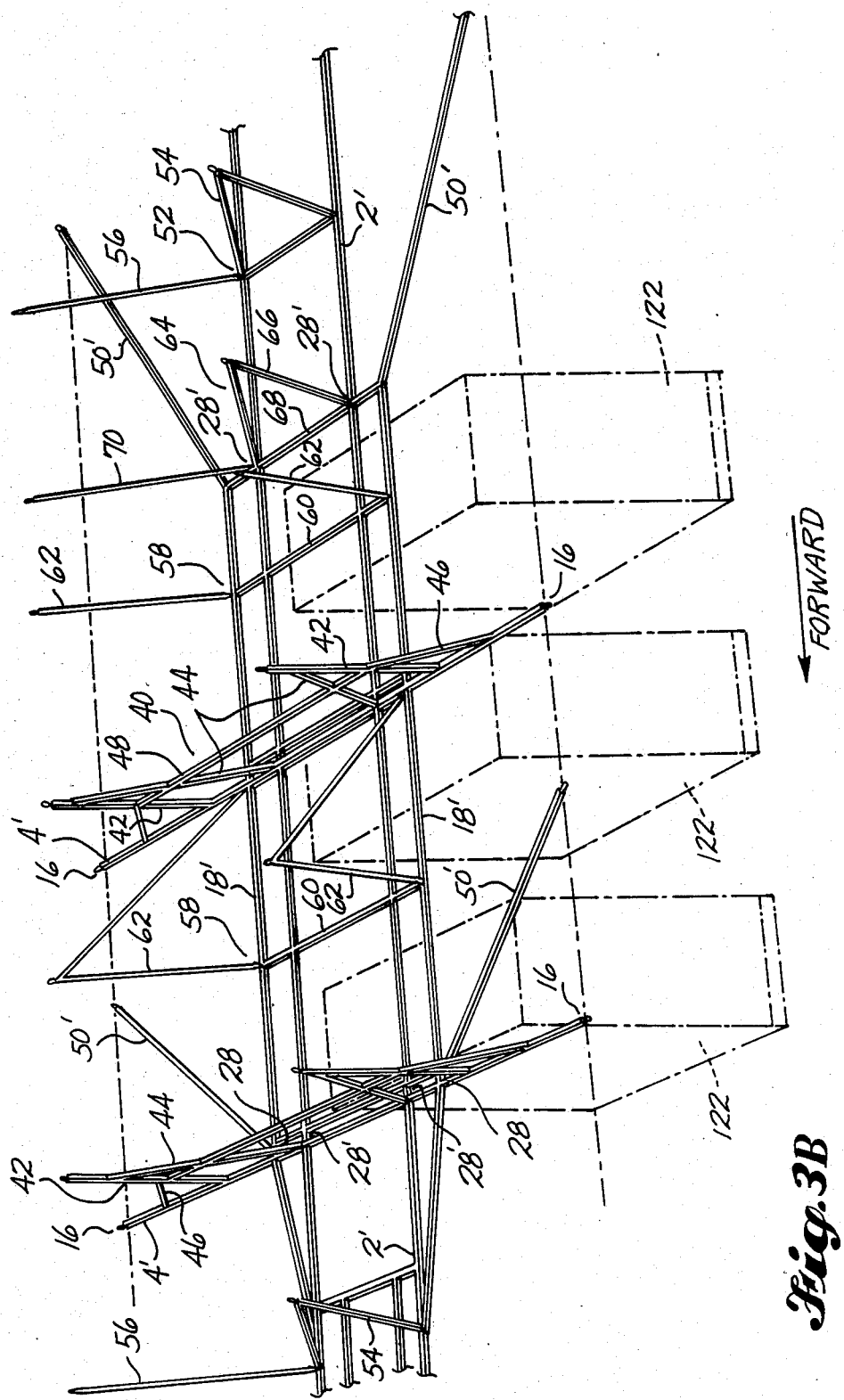

Referring to FIGS. 3A–3C, it can be seen that the diagonal struts 50, 50' of the second lateral embodiment are substantially horizontal, connecting the longitudinal sections 2' to a side portion rather than a top portion of the fuselage 1. Each strut 50, 50' extends generally aftwardly and outboardly from the section 2' to which it is connected. The struts 50, 50' associated with the two sets of longitudinal sections 2' are positioned laterally opposite each other. The struts 50, 50' perform essentially the same function as the struts 8 of the embodiment shown in FIGS. 1 and 2. They transfer axial loads from sections 2' to the fuselage 1 so that such loads will be reacted through the fuselage 1 at spread-out locations.

The truss structure of the second embodiment is most clearly visible in FIG. 4. There is one truss 40 associated with each of the transverse members 4'. Each truss 40 includes two triangular portions connected by a laterally extending horizontal member 48 spaced above and parallel to transverse member 4'. Each triangular portion has an apex and includes a vertical member 42 extending between the fuselage 1 and the transverse member 4'. A portion of the transverse member 4' forms the base of each of the triangular portions. The third side of each triangular portion is formed by a diagonal 44 that extends generally downwardly and inboardly from the top of member 42 to the transverse member 4'. In the preferred embodiment shown in FIG. 4, diagonal 44 is actually formed from two pieces each of which are attached to lateral member 48. Lateral member 48 extends between the triangular portions and through diagonals 44 and terminates at vertical members 42. The truss structure is also provided with two additional diagonals 46 that extend generally downwardly and outboardly from the two vertical members 42, respectively. The lower end of each member 46 is attached to transverse member 4' to form a triangle with a portion of member 4' and the lower portion of member 42.

FIG. 4 also illustrates some of the simple types of connectors which may be used to connect the various members of the support structure of the invention. Two types of such connectors 80, 82 are shown in FIGS. 9 and 10, respectively. Some of the locations of connectors 80, 82 in the truss structure are shown in FIG. 4. The connectors designated by reference numbers 82', 82" and 82'" in FIG. 4 are essentially the same as the connector 82 except that the angle of connection is varied. FIGS. 18–20 show connectors by means of which interior passenger elements, such as stowage bins, may be attached to the lower portions of the transverse members 4'. Typical positioning of such connectors 86, 86', 86" is illustrated in FIG. 4.

FIG. 8 is an enlarged elevational view of one of the apex portions of the truss 40 and the means by which it is connected to the fuselage 1. At the apex, member 44 is connected to member 42 by means of a connector 82'" of the type shown in FIG. 10. The crosses associated with connector 82'" in FIG. 8 indicate the location of pin joints that secure the connector 82'" to each of members 42 and 44. Another connector 84 is received into the top open end of tubular member 42. This type of connector is most clearly shown in FIG. 11. Again the crosses associated with connector 84 indicate pin joint connections of connector 84 to member 42. A support 72 is attached to the fuselage 1 and carries a downwardly depending attaching means in the form of yoke 74. The support 72 and the yoke 74 carried thereby may be permanently attached to the fuselage 1 since these elements would have very minimal, if any, effect on available cargo space in the cargo configuration. The lower end of a rod 76 is received into the axial opening in connector 84 and secured therein against translation with respect to member 42. The upper end of rod 76 is received into the yoke 74, and a pin 78 extends through aligned holes in yoke 74 and the upper end of rod 76. This connecting arrangement has the advantages of relative simplicity, reliability, and ease of connection and disconnection.

FIGS. 3A–3C together show the overall construction of the second lateral embodiment of the support structure. FIG. 3C shows the aft portion of the structure. In addition to the longitudinal sections 2' and the trusses 40, FIG. 3C illustrates supplementary vertical supports 52. An elevational view of supports 52 is shown in FIG. 5. Each support 52 includes a triangular portion 54, the base of which extends transversely between the two sets of longitudinal sections 2' and the apex of which is connected to the fuselage. Support 52 also includes a diagonal member 56 that extends upwardly and outboardly from one end of the base of triangular portion 54 and that has an upper end connected to the fuselage. As can be seen in FIGS. 3A–3C, supports 52 are positioned longitudinally between adjacent trusses 40 except in the areas that are provided with extra reinforcement. The aftmost of supports 52 provides the support to which the aft ends of the aftmost sections 2' are nontranslatably attached.

FIG. 3B shows one of these areas of extra reinforcement, the area above the galley units in the passenger configuration. The extra reinforcement in this area is necessary in order to secure the galley units 122 against overturning. The extra reinforcement includes supplementary longitudinal members 18' and vertical support members 58 that are essentially identical to the members 18 and supports 58 in the first longitudinal embodiment. A typical support 58 is shown in elevation in FIG. 6. A third type of laterally extending supplementary vertical support 64 is included in the second embodiment. One of these supports 64 is located at the aft edge of the galley area shown in FIG. 3B. FIG. 7 shows an elevational view of support 64. As can be seen, support 64 is essentially a modified version of support 52. Support 64 has a triangular portion 66 and an upwardly and outboardly extending member 70. The difference between support 64 and support 52 is that the base 68 of support 64 is extended in both directions in order to connect with the aft ends of supplementary longitudinal members 18'. The galley area shown in FIG. 3B also includes horizontal diagonals 50' that are connected to sections 2' via longitudinal members 18' and lateral members 4, 68 and that perform the same function as the diagonals 50 in the rest of the support structure.

FIG. 3A illustrates another area in which the support structure is provided with extra reinforcement. In this area, the extra reinforcement secures lavatory units 124 against overturning. At a location forward of the lavatory units, the forward ends of the forwardmost longitudinal sections 2' and the forward ends of supplementary longitudinal members 3 are connected to a transverse support by means of slip joints 28'.

Referring to FIG. 15, the preferred embodiment of the slip joint 28 that connects longitudinal sections 2' in the lateral embodiment is shown. The joint 28 includes first and second end portions that are arranged telescopically with respect to each other along the longitudinal axis of the sections 2' being connected. The first end portion is tubular and is formed by the aft end portion of the more aftward of the two sections 2' being connected. Both end portions are generally rectangular. The second end portion 96 is received into the first tubular end portion and is connected to the more forward of the two sections 2', as illustrated in FIG. 14 and as described above.

The end portion 96 includes two axially spaced apart radial walls 100 and two opposite axial walls 98 connecting edge portions of radial walls 100. When the joint 28 is assembled, the axial walls 98 are closely adjacent to the inner surfaces of the sidewalls of tubular member 2'. The joint 28 also includes a third radial wall 106 which, in the assembled joint 28, is positioned axially between spaced apart radial walls 100 and is fixed with respect to the tubular section 2' into which portion 96 is received. A resilient member 110 in the form of a block of resilient material is positioned axially between radial wall 106 and each of radial walls 100. Each resilient member 110 abuts the adjacent radial walls 100, 106. Members 110 bias portion 96 into a center axial position relative to tubular section 2', and dampen vibrations.

The joint 28 shown in FIG. 15 is provided with two opposite side openings bounded by the edges of axial walls 98 and radial walls 100. These side openings make it possible to assemble the joint 28 quickly and easily. The third radial wall 106 and the resilient members 110 are received into end portion 96 through the side openings. A fastener in the form of a bolt 108 is extended through a sidewall of section 2', through radial wall 106, and then through the opposite sidewall of section 2' to fix radial wall 106 to section 2'. Bolt 108 may be secured against slipping out of section 2' by any of a number of suitable means, such as the nut shown in FIG. 15.

Each of the axial walls 98 preferably has a cantilever portion that projects axially inwardly with respect to the aft section 2' from the inner one of radial walls 100. Each cantilever portion has an axial slot 102 extending therethrough. In the assembled joint, a pin 104 extends through a sidewall of section 2', slots 102, and an opposite sidewall of section 2'. Pin 104 allows relative axial movement of section 2' and end portion 96, but also limits such movement. Portion 96 also includes lugs 112, 114 for nontranslatably connecting a diagonal 50, 50' and a transverse member 4', respectively, to portion 96.

FIGS. 16 and 17 show the preferred embodiment of the slip joint 16 that connects the ends of the transverse members 4, 4' to the fuselage 1. Joint 16 includes an end portion 96' that is substantially the same as portion 96 of joint 28 except for its outer end. Portion 96' is received into tubular member 4, 4' and connected thereto in the same manner that portion 96 is received into and connected to tubular section 2'. The outer end of portion 96' includes a hook-like member 116. This member 116 engages a pin 120 carried by the fuselage 1 to provide a pin joint type connection between member 96' and the fuselage 1. Pin 120 is attached to an attachment member 118 that is fixed to the fuselage 1.

In each of the preferred embodiments of the support structure shown in the drawings, all of the members are made from square aluminum tubing. This tubing has the advantages of being relatively lightweight and of being capable of carrying large tension and compression loads in relation to its weight. The tubing also has the advantages of being readily adaptable to changes in the configuration of the support structure and of easily accepting additional fixtures for attaching additional passenger elements to the support structure. In both of the preferred embodiments shown in the drawings, substantially all of the connections between members are pin joint type connections so that loads in all directions will be reacted through tension and compression. The manner of making the pin joint connections is illustrated in FIG. 8, described above. The overall arrangement of relatively small and lightweight tubular members detachably connected by pin joints provides efficient load transfer and also allows efficient conversion of the interior of the aircraft from the passenger configuration to the cargo configuration and vice versa.

Each of the two embodiments shown in FIGS. 1 and 3 has its own particular advantages. The first embodiment shown in FIG. 1 has the advantage of having relatively few members and, thus, of being relatively light and inexpensive to manufacture. The second embodiment shown in FIG. 3 has the advantage of providing a shorter conversion time.

Both embodiments may be readily assembled and installed in their flight configuration in a storage building or other ground facility. This makes it possible to store the support structure in a safe and orderly manner and helps to increase the efficiency of the reinstallation into an airplane. In addition, while in the ground facility, the support structure may be used for training or experimental purposes.

The method of the invention basically comprises arranging the sections 2, 2' end-to-end and connecting them together with the extension/retraction joints 14, 28, 28'. The diagonal struts 8, 50, 50' are each connected with one end being connected to the sections 2, 2' just forward of the joint 14, 28, 28' and the other end being connected to the fuselage 1 aft of the first end. The sections 2, 2' are allowed to slip axially relative to each other when subjected to axial loads. This allows the loads to be transferred from the sections 2, 2' to the diagonal struts 8, 50, 50' and to be reacted through the fuselage 1. The preferred embodiment of the method of the invention also includes attaching a mid portion of each of the transverse members 4, 4' to one of the sections 2, 2' and connecting the ends of the transverse members 4, 4' to opposite sides of the fuselage 1 by means of extension/retraction joints 16. The transverse members 4, 4' are allowed to slip axially relative to the fuselage 1 to in turn allow the fuselage 1 to "breathe". The method is preferably further carried out by nontranslatably connecting an apex of each of the vertically oriented trusses 6, 40 to the fuselage 1 and a lower portion of each truss 6, 40 to one of the sections 2, 2' and allowing the trusses 6, 40 to react vertical loads through the fuselage 1. In addition, the preferred embodiment of the method includes detaching the members of the support structure from each other and the fuselage 1 and removing such members from the fuselage 1 when it is desired to convert the aircraft into its cargo configuration.

It will be obvious to those skilled in the art to which this invention is addressed that the invention may be used to advantage in a variety of situations. Therefore it is also to be understood by those skilled in the art that various changes, modifications, and omissions in form and detail may be made without departing from the spirit and scope of the present invention as defined by the following claims.

What is claimed is:

1. A method of supporting interior elements of an aircraft within an aircraft fuselage, comprising:
    arranging a plurality of longitudinal sections end-to-end along a common longitudinal axis;
    connecting each section to any adjacent section with an extension/retraction joint;
    nontranslatably connecting one end of a diagonal strut to one of the sections just forward of each such joint, and the other end of said strut to the fuselage aft of said one end; and
    allowing said sections to slip axially relative to each other when subjected to axial loads, and allowing said loads to be transferred from said sections to the diagonal struts and to be reacted through the fuselage.

2. A method as described in claim 1, further comprising attaching an axially intermediate portion of each of a plurality of transverse members to one of said sections, connecting the ends of each transverse member to opposite sides of the fuselage with extension/retraction joints, and allowing the transverse members to slip axially relative to the fuselage to allow for expansion and deflection of the fuselage caused by pressurization and maneuver loads.

3. A method as described in claim 2, further comprising nontranslatably connecting an apex of each of a plurality of vertically oriented trusses to the fuselage, and a lower portion of each such truss to one of said sections; and allowing said trusses to react vertical loads through the fuselage.

4. A method of supporting interior elements for passengers within a portion of an aircraft fuselage and of converting said portion to a configuration for carrying cargo with maximized cargo space, comprising:
    arranging a plurality of longitudinal sections end-to-end along a common longitudinal axis;
    detachably connecting each section to any adjacent section with an extension/retraction joint;
    nontranslatably and detachably connecting one end of a diagonal strut to one of the sections just forward of each such joint, and the other end of said strut to the fuselage aft of said one end;
    allowing said sections to slip axially relative to each other when subjected to axial loads, and allowing said loads to be transferred from said sections to the diagonal struts and to be reacted through the fuselage; and
    detaching said sections from each other and said struts from said sections and the fuselage, and removing said sections and said struts from said portion of the fuselage, to convert said portion to a cargo configuration.

5. Support structure for supporting interior elements of an aircraft within an aircraft fuselage, comprising:
    a plurality of longitudinal sections arranged end-to-end along a common longitudinal axis;
    an extension/retraction joint connecting each such section and any adjacent section, to allow axial slippage of each such section relative to the other sections;
    a plurality of diagonal struts, one corresponding to each such joint; each such strut having a first end nontranslatably connected to one of said sections at a location forward of and closely adjacent to the corresponding joint, and a second end nontranslatably connected to the fuselage at a location aft of the corresponding joint; and
    means for reacting vertical and side loads;
    wherein axial loads on said sections cause said sections to slip axially relative to each other, and wherein said axial loads are transferred from said sections to the diagonal struts and are reacted through the fuselage.

6. Support structure as described in claim 5, in which the means for reacting vertical and side loads includes a plurality of transverse members each of which is attached to one of said sections and has a longitudinal axis substantially perpendicular to said axis of said sections and two opposite ends connected to the fuselage, and extension/retraction joint means for allowing axial slippage of said members to allow for expansion and deflection of the fuselage caused by pressurization and maneuver loads.

7. Support structure as described in claim 5, in which the means for reacting vertical and side loads includes a plurality of vertically oriented trusses, each of which has an apex nontranslatably connected to the fuselage and a lower portion nontranslatably connected to one of said sections.

8. Support structure as described in claim 6, in which the means for reacting vertical and side loads further includes a plurality of vertically oriented trusses, each of which has an apex nontranslatably connected to the fuselage and a lower portion nontranslatably connected to one of said sections and one of said transverse members.

9. Support structure as described in claim 8, in which each such extension/retraction joint includes means for quickly and easily disconnecting said sections from each other, and said extension/retraction joint means comprises an extension/retraction joint detachably connecting each of said ends of said transverse members to the fuselage; and which further comprises an extension/retraction joint detachably connecting the forward end of the forwardmost of said sections to a first support, means for nontranslatably and detachably attaching the aft end of the aftmost of said sections to a second support, and means for quickly and easily disconnecting said sections from said transverse members and said diagonal struts, said diagonal struts from the fuselage, and said trusses from the fuselage and said sections and transverse members; wherein said support structure is removable from the aircraft to increase available cargo space within the fuselage.

10. Support structure as described in claim 6, in which said extension/retraction joint means comprises an extension/retraction joint detachably connecting each of said ends of said transverse members to the fuselage; each of said sections and said transverse members comprises a tubular body; and each of said extension/retraction joints includes a sliding portion that is removably and telescopically received into one of said tubular bodies, and biasing means for biasing said sliding portion into a center axial position relative to said tubular body.

11. Support structure as described in claim 10, in which each said sliding portion includes two axially spaced apart radial walls; and in which each said extension/retraction joint further includes a third radial wall that is positioned axially between said spaced apart radial walls and that is fixed with respect to the tubular body, and a resilient member positioned axially between and abutting said third radial wall and each of said spaced apart radial walls.

12. Support structure as described in claim 5, in which each said diagonal strut extends generally upwardly and aftwardly from said section to which it is nontranslatably connected; and in which the means for reacting vertical and side loads includes a plurality of transverse members each of which is attached to one of said sections and has a longitudinal axis substantially perpendicular to said axis of said sections and two opposite ends connected to the fuselage, extension/retraction joint means for allowing axial slippage of said members to allow for expansion and deflection of the fuselage caused by pressurization and maneuver loads, and a plurality of vertically oriented trusses each of which has a first member formed by one of said diagonal struts, a second member formed by a portion of said sections, and a generally vertical third member connecting said first and second members.

13. Support structure as described in claim 5, in which each said diagonal strut is substantially horizontal; and in which the means for reacting vertical and side loads includes a plurality of transverse members each of which is attached to one of said sections and has a longitudinal axis substantially perpendicular to said axis of said sections and two opposite ends connected to the fuselage, extension/retraction joint means for allowing axial slippage of said members to allow for expansion and deflection of the fuselage caused by pressurization and maneuver loads, and a plurality of vertically oriented trusses each of which has a first member formed by a portion of one of said transverse members, a vertical second member, a third member connecting said first and second members, and an apex at which said second and third members are connected to each other and the fuselage.

14. Support structure as described in claim 13:
in which said sections and extension/retraction joints form a first set of sections; and
which further comprises a second set of sections parallel to and laterally spaced from said first set and substantially identical to said first set, each said transverse member being attached to one of the sections in said second set; and a substantially horizontal diagonal strut corresponding to each joint in said second set and having a first end nontranslatably connected to one of the sections in said second set at a location forward of and closely adjacent to the corresponding joint and a second end nontranslatably connected to the fuselage at a location aft of the corresponding joint and laterally opposite the location at which one of the diagonal struts extending between the sections in said first set and the fuselage is connected to the fuselage.

15. Removable support structure for supporting interior elements of an aircraft within an aircraft fuselage, comprising:
means for reacting vertical and side loads; said means including a plurality of transverse members each of which has a longitudinal axis and two opposite ends detachably connected to the fuselage, and extension/retraction joint means for allowing axial slippage of such members to allow for expansion and deflection of the fuselage caused by pressurization and maneuver loads;
a plurality of longitudinal sections arranged end-to-end along a common longitudinal axis substantially perpendicular to said axis of said transverse members; one of said sections being detachably attached to each transverse member;
an extension/retraction joint detachably connecting each said section and any adjacent section to allow axial slippage of each said section relative to the other sections; and
a plurality of diagonal struts, one corresponding to each such joint; each such strut having a first end nontranslatably and detachably connected to one of said sections at a location forward of and closely adjacent to the corresponding joint, and a second end nontranslatably and detachably connected to the fuselage at a location aft of the corresponding joint;
wherein axial loads on said sections cause said sections to slip axially relative to each other, and wherein said axial loads are transferred from said sections to the diagonal struts and are reacted through the fuselage.

16. A joint for connecting two members and for allowing said members to translate with respect to each other along an axis, comprising:
first and second end portions arranged telescopically with respect to each other along said axis; each such portion being attached to a different one of said members; said first end portion being tubular, and said second end portion being received into said first end portion; and said second end portion having two axially spaced apart radial walls, axial wall portions connecting edge portions of said spaced apart radial walls, and at least one side opening;
a third radial wall positioned axially between said spaced apart radial walls
a resilient member positioned axially between and abutting said third radial wall and each of said spaced apart radial walls; and fastening means for fastening said third radial wall to said first end portion to fix said third radial wall relative to said first end portion;

wherein said opening is positioned and dimensioned to receive said third radial wall and said resilient members.

17. A joint for connecting two members and for allowing said members to translate with respect to each other along an axis, comprising:

first and second generally rectangular end portions arranged telescopically with respect to each other along said axis, each such portion being attached to a different one of said members, said first end portion being tubular, and said second end portion being received into said first end portion and having two axially spaced apart radial walls;

a third radial wall positioned axially between said spaced apart radial walls and fixed with respect to said first end portion;

a resilient member positioned axially between and abutting said third radial wall and each of said spaced apart radial walls; said second end portion including two opposite axial walls connecting edge portions of said spaced apart radial walls, and at least one side opening for receiving said third radial wall and said resilient members; and fastening means extending through said third radial wall and opposite sidewalls of said first end portion to fix said third radial wall relative to said first end portion.

18. A joint as described in claim 17, in which each said axial wall has a cantilever portion projecting axially inwardly with respect to said first end portion, each said cantilever portion having an axial slot therethrough; and which further includes a pin extending through said slots and opposite sidewalls of said first end portion, to allow relative axial movement of said end portions and to limit such movement.

* * * * *